J. M. Rohrer.
Oxidizing and Desulphurizing Ores.
No. 88,741. Patented Apr. 6, 1869.

Witnesses
Fred'k Haynes
Arthur Kenner

Inventor
J. M. Rohrer
per
Attorneys

JAMES M. ROHRER, OF PINE GROVE, PENNSYLVANIA.

Letters Patent No. 88,741, dated April 6, 1869.

IMPROVED APPARATUS FOR DESULPHURIZING AND OXIDIZING ORES.

The Schedule referred to in these Letters Patent and making part of the same.

*To all whom it may concern:*

Be it known that I, JAMES M. ROHRER, of Pine Grove, in the county of Schuylkill, and State of Pennsylvania, have invented a new and improved Apparatus for Oxidizing and Desulphurizing Ores; and I do hereby declare that the following is a full, clear, and exact description of the same, reference being had to the accompanying drawing, forming a part of this specification.

The invention consists in the novel arrangement above the smelting-point of a blast-furnace, of pipes, and tuyeres, for the admission of water, steam, and air, separately or combined, into the hot stock during the smelting-operation, whereby sulphur, or other impurities contained in the ore, may be more effectually expelled, and a better quality of metal thereby obtained.

Figure 1:
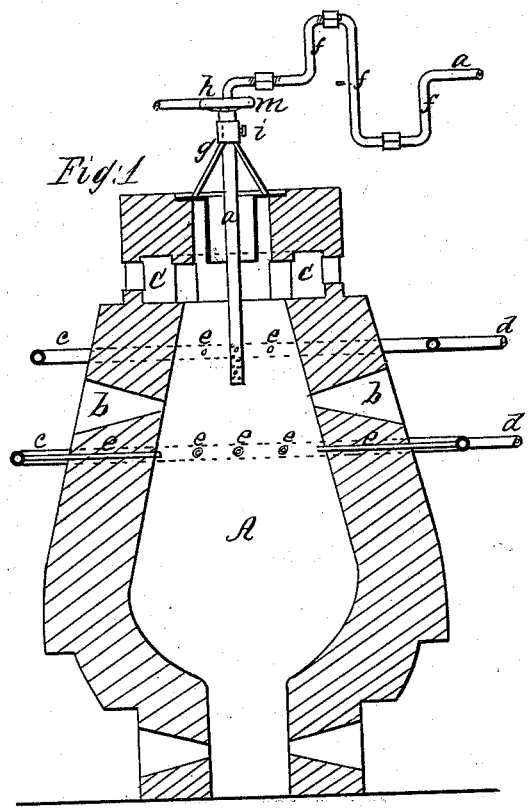
Figure 2:
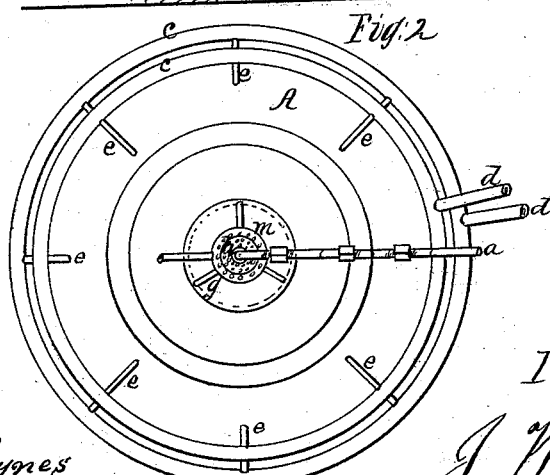

Figure 1, in the accompanying drawing, represents a sectional elevation of a blast-furnace, provided with my apparatus for oxidizing and desulphurizing ores, and Figure 2 represents a plan view of the same.

Similar letters of reference indicate corresponding parts in both figures.

A is the blast-furnace, of the ordinary form and construction, except that it is provided, at a point above the smelting-point, with a vertically-arranged pipe, $a$, air-tuyeres $b$, and pipes $e$, fed by circular pipes $c$ $c$.

The pipe $a$ is inserted through the mouth of the furnace A, its lower extremity extending about six (6) feet, more or less, or other suitable distance, according to the size and construction of the furnace, below the flues C, and its outer extremity communicating with a steam-boiler, for the introduction of water or steam, or both, to the hot stock contained in the furnace.

At or near the central portion of this pipe $a$, is, or may be, arranged a compound rotating joint, $f$, for the purpose of raising or lowering the pipe in the furnace.

The said air-tuyeres $b$ are situated below and near the lower termination of the pipe $a$, and are designed, by the induction of air, for the more effectual combining of sulphur, phosphorus, or other impurities, and for carrying off the same with the escaping gases.

With the mode of operation and the material used in some furnaces, the tube $a$, which is in itself to some extent a superheating arrangement, will answer for the oxidizing and freeing from impurities the hot stock in the furnace, but with different ores it is sometimes desirable to introduce steam, either separately or in connection with air, through the sides of the furnace.

For this purpose pipes $e$, communicating with circular pipes or distributers $c$ $c$, are arranged to pass through the sides of the furnace, above and below the air-tuyeres $b$, and are provided with induction, or feed-pipes $d$ $d$, communicating with the boiler for admission of steam or water, or both, and for conveying the same into the interior of the furnace.

The vertical pipe $a$ is, or may be, perforated near its lower extremity, and the end closed, for the more general and uniform distribution of the water or steam passing through it to the hot stock.

$g$ is a tripod, arranged upon the top of the furnace for support of pipe $a$, and through which the said pipe is allowed to slide during its vertical adjustment. Said pipe may be secured at any desirable adjustment by means of a set-screw, $i$.

$h$ is a sprinkler, or perforated basin, arranged at or upon the top of the tripod $g$, and through which the pipe $a$ is also allowed to slide.

Said sprinkler $h$ consists of a perforated basin of sheet-metal, with a pipe, $m$, around its circumference, also perforated, and through which the water is admitted from a suitably-arranged tank, or other convenient source, and equally distributed over the surface of the perforated basin $h$, thereby causing a shower of water to fall over the stock as it is being charged into the furnace.

The steam or water, coming in contact with the ignited stock in the furnace, is decomposed, the ore is oxidized, and sulphur and phosphorus, if present, are expelled in the form of sulphuretted and phosphoretted-hydrogen gases, or may, under certain conditions, be expelled as sulphurous and phosphorous-acid gases.

What I claim as my invention, and desire to have secured by Letters Patent, is—

1. The application of air and water, or air and steam, separately or combined, to the hot stock of a blast-furnace above the smelting-point, during the smelting-operation, substantially as herein described.

2. The vertically-arranged tube $a$, applied to a blast-furnace, substantially as and for the purpose herein set forth.

3. The arrangement, in the upper part of a blast-furnace, of air-tuyeres $b$, substantially as and for the purpose herein set forth.

4. The arrangement, relatively to the air-tuyeres $b$, of the pipes $c$, $d$, and $e$, substantially as and for the purpose specified.

5. The combination and arrangement of the sprinkler $h$ and perforated pipe $m$, as applied to a blast-furnace, substantially as and for the purpose herein set forth.

JAMES M. ROHRER.

Witnesses:
A. G. MANWILLER,
HENRY WERNTZ.